(12) United States Patent
Hwang

(10) Patent No.: US 6,305,632 B1
(45) Date of Patent: Oct. 23, 2001

(54) TELECOMMUNICATIONS CORD REEL

(76) Inventor: Lih-Jiuan Hwang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/517,325

(22) Filed: Mar. 2, 2000

(51) Int. Cl.[7] .................................................. B65H 75/48
(52) U.S. Cl. ...................... 242/378.1; 242/372; 242/380
(58) Field of Search .............................. 242/378.1, 380, 242/372; 439/501

(56) References Cited

U.S. PATENT DOCUMENTS 5,544,836 * 8/1996 Pera ...................................... 242/372

* cited by examiner

Primary Examiner—John Q. Nguyen

(57) ABSTRACT

A telecommunications cord reel design in which the telecommunications cord is automatically and neatly rewound in a structure that is comprised of a housing internally containing on a reel, a rewinding mechanism, and other components. The reel consists of an upper reel plate and a lower reel plate that are engaged together for assembly and, furthermore, the telecommunications cord is routed through insertion notches in the center of the reel, enabling the telecommunications cord to be wound around the upper and lower end faces of the reel, with the rewinding mechanism anchored on an annular wall at the top end of the lower reel plate. As such, the structure of the present invention provides for the automatic rewinding and storage of the telecommunications cord on the reel and, furthermore, cord extension requires minimal force and overall operation is simpler and more convenient.

6 Claims, 5 Drawing Sheets

TELECOMMUNICATIONS CORD REEL

BACKGROUND OF THE INVENTION

1) Field of the Invention

The invention herein relates to a telecommunications cord reel structural design, specifically referring to a telecommunications cord reel for neatly rewinding the telecommunications cord of conventional telephones and handsets, preventing the entanglement of such telecommunications cords and, furthermore, that is capable of achieving easy cord extension at minimal force, while also automatically rewinding the cord when the handset is cradled on the telephone.

2) Description of the Prior Art

Most conventional telecommunications cords utilized between telephones and handsets are designed with preformed helical coils capable of stretching and returning to original length, such that when users utilize the telephone, the elastic properties of the telecommunications cord increases the extension range of the handset, but without the occurrence of binding. However, the said helical-type handset telecommunications cord following a given frequency of usage tends to become twisted by the manual force of the user, causing the coils to become entangled and resulting in a feeling of increased grasping tension when the handset is picked up and, furthermore, excessively twisting the telecommunications cord at the handset, the strain of which could easily break the individual conductors inside.

SUMMARY OF THE INVENTION

The primary objective of the invention herein is to provide a telecommunications cord reel design comprised of a housing internally containing a reel, a rewinding mechanism, and other components and in which the reel consists of an upper reel plate and a lower reel plate that are engaged together for assembly and, furthermore, the telecommunications cord is routed through insertion notches in the center of the reel, enabling the telecommunications cord to be wound around the upper and lower end faces of the reel, with the rewinding mechanism anchored on an annular wall at the top end of the lower reel plate. As such, the structure of the present invention provides for the automatic rewinding and storage of the telecommunications cord on the reel and, furthermore, cord extension requires minimal force and overall operation is simpler and more convenient.

Another objective of the invention herein is to provide a telecommunications cord reel design in which the rewinding mechanism utilizes two elastic components that are anchored to the two ends of the annular walls of the reel, with the other extremities actively hinged around a fixed area such that pulling out the exposed end of the telecommunications cord causes the reel to rotate producing in the process a fixed retractile tension of a torsion spring anchored around the annular wall of the reel; as such, the telecommunications cord can be extended for utilization easily with minimal force or automatically rewound.

DETAILED DESCRIPTION OF THE PREFERRED EMBODIMENTS

Figure 1:
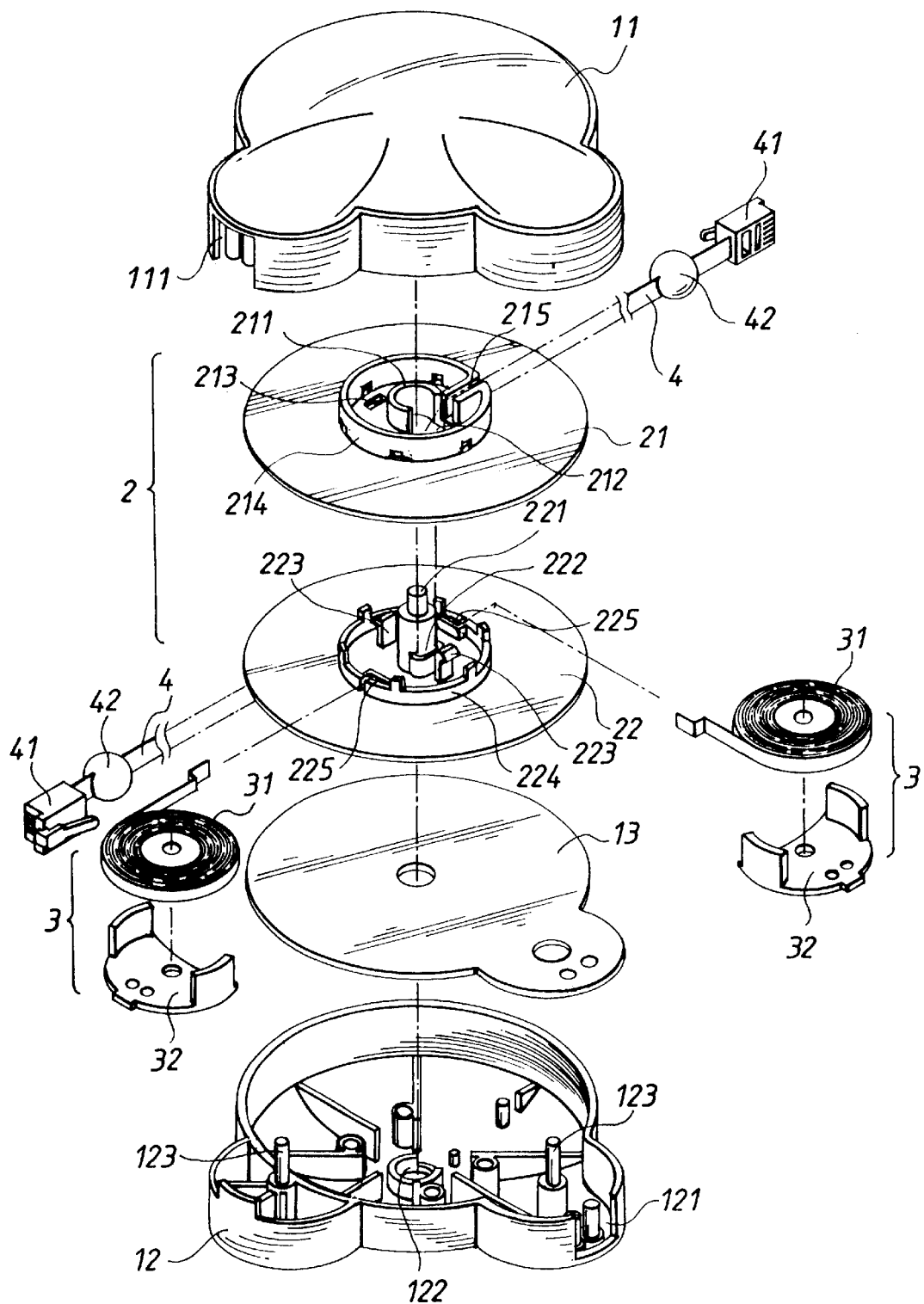
FIG. 1 is an exploded drawing of the invention herein.
Figure 2:
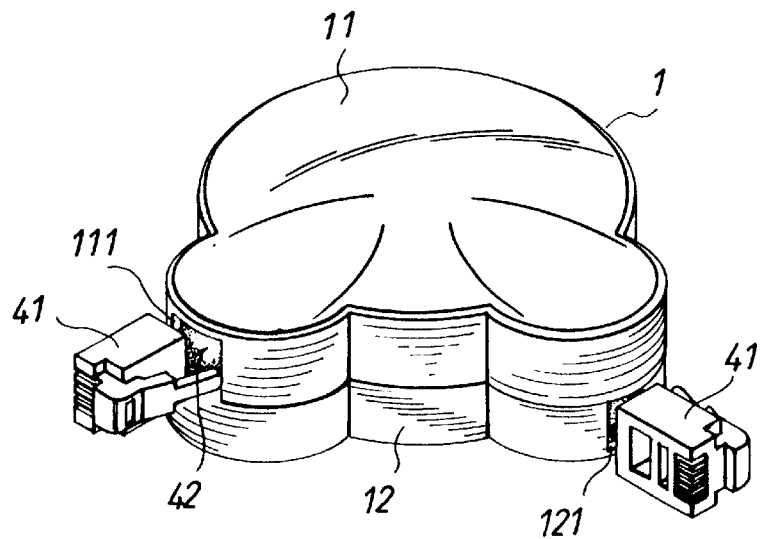
FIG. 2 is an isometric drawing of the invention herein.
Figure 3:
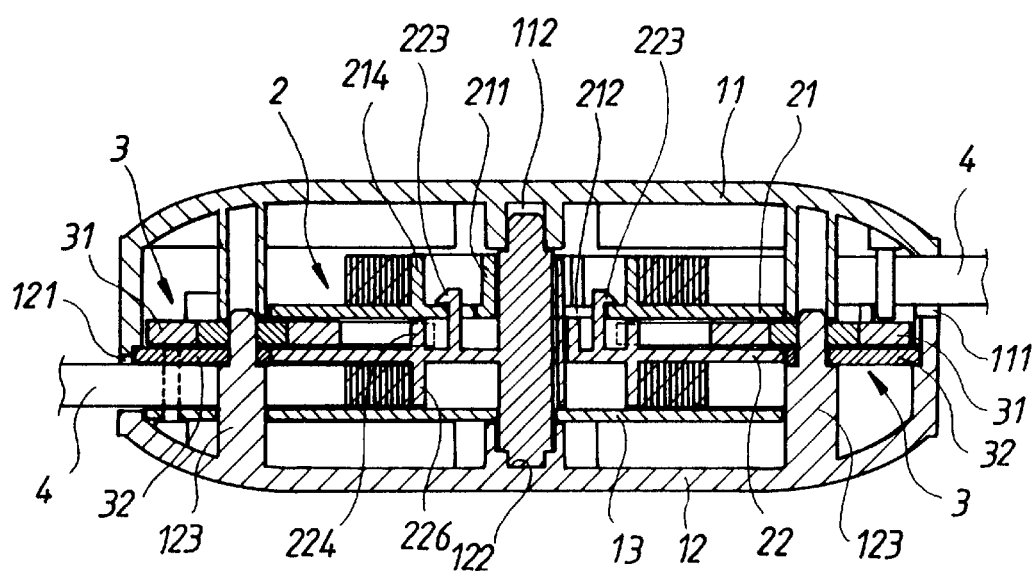
FIG. 3 is a cross-sectional drawing of the invention herein.

Referring to FIG. 1, FIG. 2, and FIG. 3, the structure of the telecommunications cord reel herein is comprised of a housing 1 internally containing a reel 2, a rewinding mechanism 3, and other components, such that the rewinding mechanism 3 is capable constantly exerting a fixed and, furthermore, appropriate degree of elastic force to retract the telecommunications cord 4 around the reel 2, wherein:

The housing 1 consists of an upper case half 11 and lower case half 12 that are assembled together; an opening 111 is formed in a side wall of the upper case half 11 and an opening 121 is formed in a side wall of the lower case half 12, with the two openings 111 and 121 constituting staggered interlocking fixtures; shaft end retainers 112 and 122 are respectively formed at the centers of the interior sections of the upper and lower case halves 11 and 12 and, furthermore, connecting rods 123 can be optionally formed in the lower case half 12 to enable the securing of a bottom plate 13 inside the lower case half 12.

Figure 4:
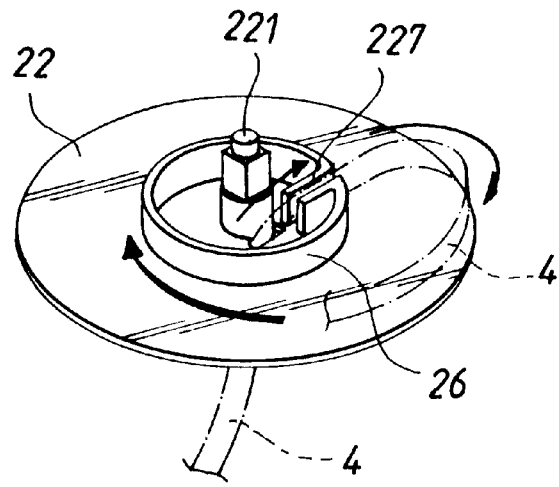
FIG. 4 is an isometric drawing of a telecommunications cord being wound from the bottom end of the reel.

The reel 2 consists of an upper reel plate 21 and a lower reel plate 22; a shaft sleeve 211 and a through-hole 212 are formed in the center at the top end of the said upper reel plate 21 and, furthermore, a catch slot 213 is formed on each of the two sides of the shaft sleeve 211 as well as an upper annular wall 214 around the shaft sleeve 211 and the catch slots 213 and, furthermore, enables a guide slot 215 to be disposed contiguously from the through-hole 212 to the outer side of the upper annular wall 214; the said lower reel plate 22 has a shaft column 221 and insertion notches 222 extending from its two top and bottom ends; lock tabs 223 formed around the shaft column 221 that are aligned with the catch slots 213; an annular wall 224 is formed around the shaft column 211 extending from the surface of the top end; aligned hook slots 225 are formed in the said annular wall 224; and a lower annular wall 226 is formed around the shaft column 221 extending from the surface of the bottom end such that a guide slot 227 is disposed contiguously from an insertion notch 222 to the outer side of the lower annular wall 226 (as shown in FIG. 4); as such, the shaft column 221 of the lower reel plate 22 is inserted through the shaft sleeve 211 from the bottom end, enabling the engagement of the lock tabs 223 and the catch slots 213 to assemble the reel 2.

Figure 6:
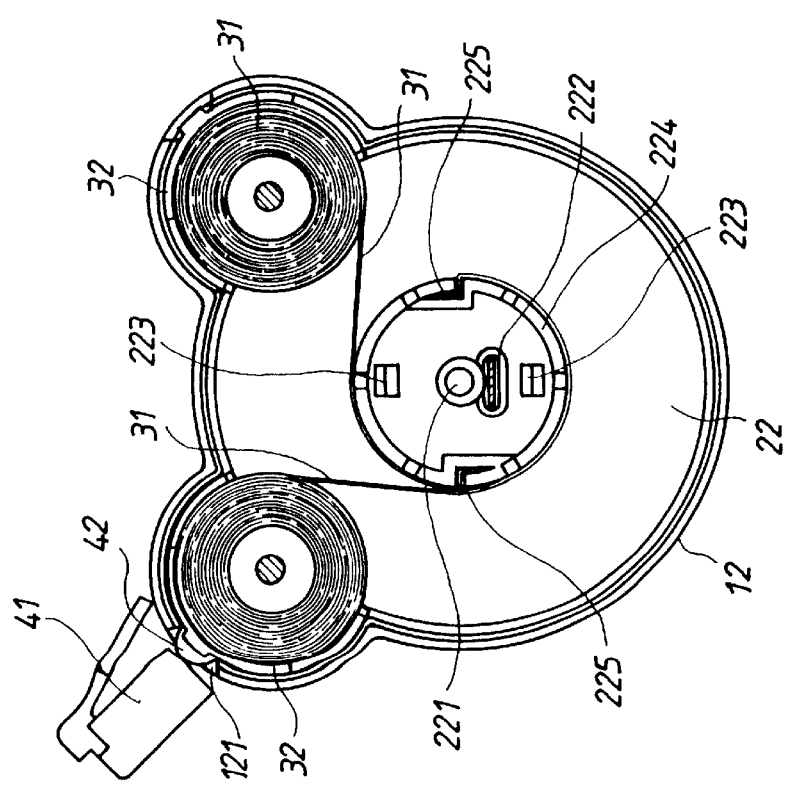
FIG. 6 is an orthographic drawing of the torsion spring during the winding of the telecommunications cord.

The rewinding mechanism 3 consists of a torsion spring 31 and a backing plate 32; the said backing plate 32 is sleeved over the connecting rod 123 of the lower case half 12, with one end of the torsion spring 31 ensconced in a hook slot 225 of the reel 2 and the other end movably hinged to the connecting rod 123 projecting through the backing plate 32, thereby generating a fixed pulling force against the reel 2 (as shown in FIG. 6).

The telecommunications cord 4 is a flat arrangement of conductors, the front end of which is threaded downward from an insertion notch 222 of the lower reel plate 22 and inserted upward out of a through-hole 212 of the upper reel plate 21 and, furthermore, fitted into the guide slot 215 before being routed to the outer side of the upper annular wall 214 and then wound around the circumferential face of the upper annular wall 214; the rear end of the telecommunications cord 4 remaining at the lower extent of an insertion notch 222 of the lower reel plate 22 is fitted into the guide slot 227 before being routed to outer side of the lower annular wall 226 and the wound onto the lower annular wall 226 in the same direction as the front end; furthermore, a plug 41 and a stop block 42 are installed at both the front and rear ends of the telecommunications cord 4.

Figure 5:
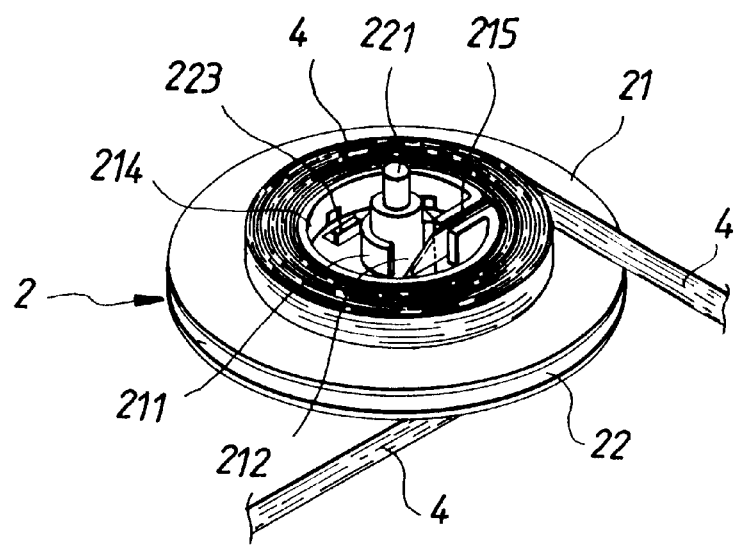
FIG. 5 is an isometric drawing of the telecommunications cord wound on the reel.

When the said structure is utilized, as indicated in FIG. 5, the telecommunications cord 4 is first installed to and wound around the reel 2, then the reel 2 and the rewinding mechanism 3 are sequentially installed inside the housing 1, wherein the shaft columns 221 at the upper and lower ends are respectfully inserted into the shaft end retainers 112 and 122 thereby enabling the free rotation of the reel 2 inside the housing 1, while the front and rear ends of the telecommunications cord 4 are respectively inserted into the openings 111 and 112 such that the telecommunications cord 4 is readily pulled out of the openings 111 and 112 for utilization; when the structure is no longer being utilized, the retractile tension of the rewinding mechanism 3 rotates the said reel 2 in the opposite direction such that the telecommunications cord 4 extending from the housing 1 is rewound back in; as such, the telecommunications cord reel of the invention herein is capable of rewinding and neatly storing the telecommunications cord 4, thereby preventing a confusing disarray in an operation that simple and expedient.

Figure 7:
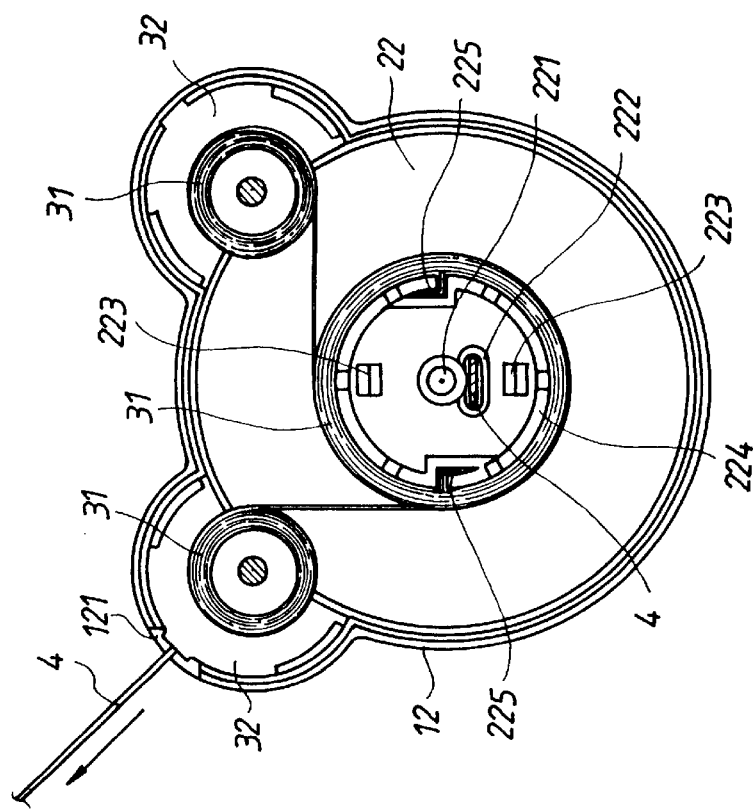
FIG. 7 is an orthographic drawing of the torsion spring during the unwinding of the telecommunications cord.

Referring to FIG. 7, when the telecommunications cord 4 is pulled out and extended from the housing 1, the said reel 2 is rotated by the unrolling action of the telecommunications cord 4, producing in the process a retractile tension of the torsion spring 31 since one end is anchored around the circumferential face of the upper annular wall 214 of the rotating reel 2; however, since the other end of the said torsion spring 31 is movably hinged on the connecting rod 123, the telecommunications cord 4 is extremely easily and smoothly pulled outward; when the telecommunications cord 4 is not being utilized, the retractile tension of the said torsion spring 31 positioned on the connecting rod 123 causes the reel 2 to revolve in the opposite direction such that the exposed portion of the telecommunications cord 4 is rewound back inside onto the reel 2 and, furthermore, the stop block 42 halts the rewinding process at the openings 111 and 112 such that both the front and rear ends of the telecommunications cord 4 are not retracted into the housing 1.

Figure 8:
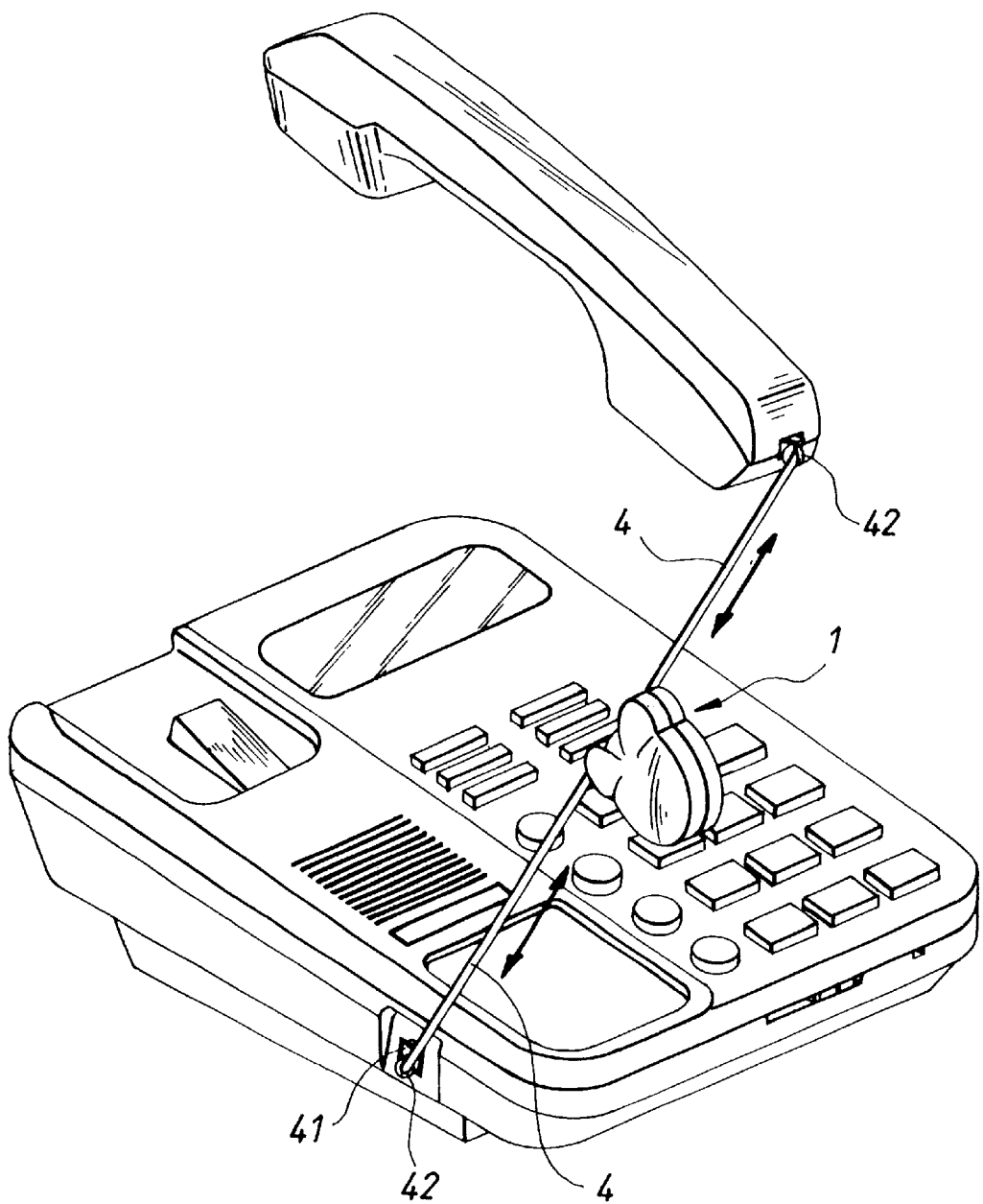
FIG. 8 is an isometric drawing of an application embodiment of the invention herein.

Referring to FIG. 8, when the telecommunications cord reel of the invention herein is installed between a telephone and its handset in the application embodiment depicted, the plugs 41 at the two ends of the telecommunications cord 4 are respectively inserted in to the sockets of the telephone and the handset such that when the handset is utilized, the said telecommunications cord 4 is capable of emerging easily and smoothly, while constantly accommodating changes in the distance between the handset and the telephone without entanglement and, furthermore, when the handset is cradled on the telephone, the extendible telecommunications cord 4 is completely retracted into the housing 1 leaving none of the exposable length outside and, furthermore, is rewound neatly, rapidly, and conveniently.

Furthermore, the overall structure of the invention herein is not limited by differing modes or types of actual application, the scope of which includes utilization as a telephone cord, a notebook computer modem cord, and a modem transmission cord.

What is claimed is:

1. A telecommunications cord reel comprised of a housing internally containing a reel, a rewinding mechanism, such that the said rewinding mechanism is capable constantly exerting a fixed and, furthermore, appropriate degree of elastic force to retract the telecommunications cord around the said reel, wherein:

the said housing consists of an upper case half and lower case half that are assembled together; an opening is formed in a side wall of the said upper case half and an opening is formed in a side wall of the said lower case half, with the said two openings constituting staggered interlocking fixtures;

the said reel consists of an upper reel plate and a lower reel plate; a shaft sleeve and a through-hole are formed in the center at a top end of the said upper reel plate as well as an upper annular wall around the said shaft sleeve; the said lower reel plate has a shaft column and insertion notches extending from top and bottom ends of said lower reel plate; an annular wall is formed around the said shaft column extending from the surface of the top end; and a lower annular wall is formed around the said shaft column extending from the surface of the bottom end;

in the said rewinding mechanism, a torsion spring is hooked to the said annular wall of said lower reel plate of the said reel and the other end is movably hinged to a connecting rod on said housing;

the said telecommunications cord is a flat arrangement of conductors having a plug and a stop block installed at both front and rear ends and, furthermore, the front and rear ends are wound in the same direction around the upper and lower annular walls of the said reel;

when the said structure is utilized, the said telecommunications cord is first installed to and wound around the said reel, then the said reel and the said rewinding mechanism are sequentially installed inside the said housing, wherein the front and rear ends of the said telecommunications cord are respectively inserted into the said two openings such that the said telecommunications cord is readily pulled out of the said two openings for utilization or the retractile tension of the said rewinding mechanism rotates the said reel in the opposite direction such that the said telecommunications cord extending from the said housing is rewound back in; as such, the telecommunications cord reel herein is capable of rewinding and neatly storing the said telecommunications cord, thereby preventing confusing disarray in an operation that is simple and expedient.

2. The cord reel of claim 1 wherein, shaft end retainers are respectively formed at the centers of interior sections of the said upper and lower case halves and, furthermore, the said connecting rod is formed in the said lower case half.

3. The cord reel of claim 1 wherein, the said rewinding mechanism is equipped with said torsion spring.

4. The cord reel of claim 3 wherein, more than one said rewinding mechanism are installed therein.

5. The cord reel of claim 1 wherein, one or more than one hook slot are formed in the said annular wall of the said lower reel plate.

6. The cord reel of claim 1 wherein, the said reel utilizes a number of catch slots formed in the said upper reel plate and a number of lock tabs formed around the said lower reel plate shaft column that enable aligned engagement of the lock tabs and the catch slots for assembly.

* * * * *